July 6, 1965 C. VIVIER 3,192,839
ADJUSTABLE VIBRATION CYLINDER, NOTABLY FOR ROAD ROLLER
Filed Aug. 14, 1962 3 Sheets-Sheet 1

July 6, 1965  C. VIVIER  3,192,839
ADJUSTABLE VIBRATION CYLINDER, NOTABLY FOR ROAD ROLLER
Filed Aug. 14, 1962  3 Sheets-Sheet 2
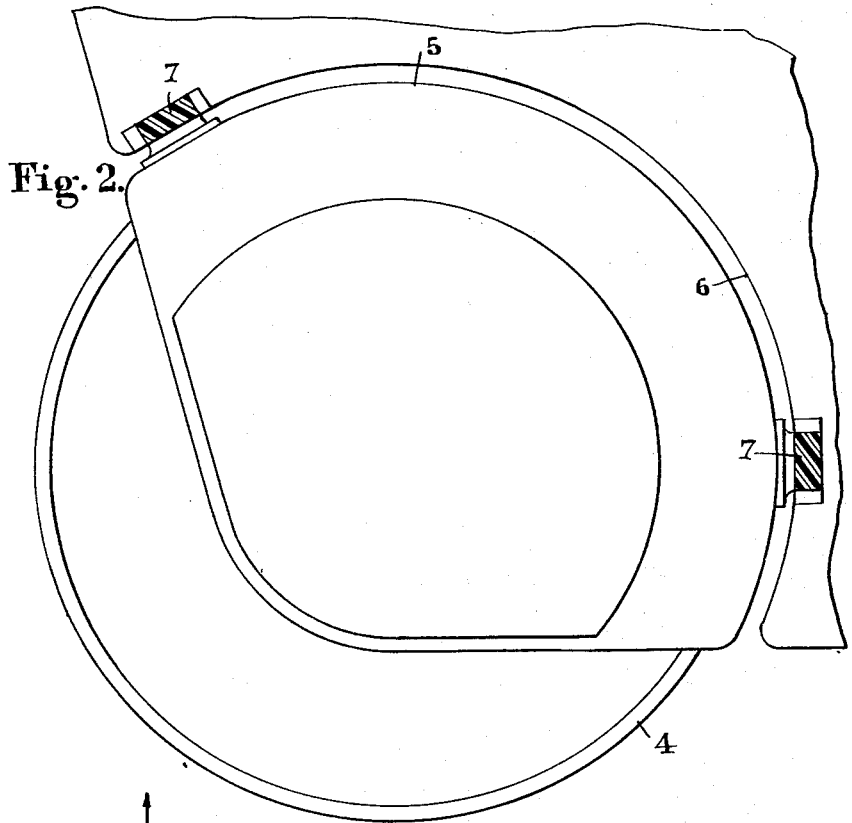
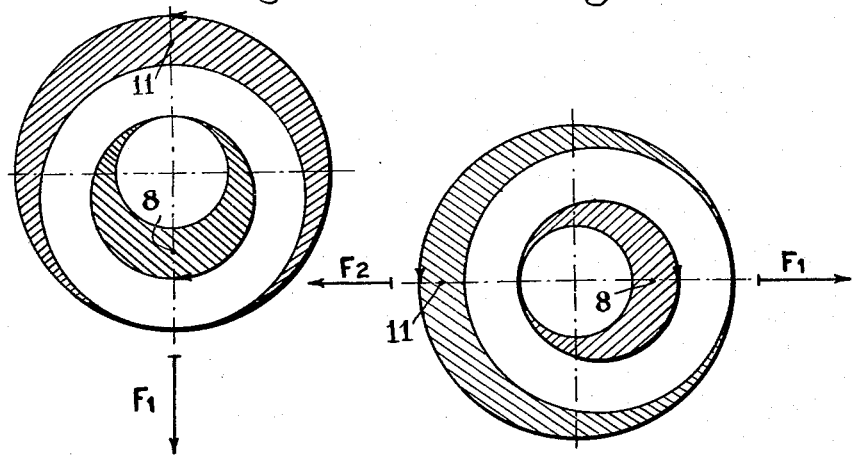

July 6, 1965    C. VIVIER    3,192,839
ADJUSTABLE VIBRATION CYLINDER, NOTABLY FOR ROAD ROLLER
Filed Aug. 14, 1962    3 Sheets-Sheet 3

United States Patent Office 3,192,839
Patented July 6, 1965

3,192,839
ADJUSTABLE VIBRATION CYLINDER, NOTABLY
FOR ROAD ROLLER
Claude Vivier, Charleville (Ardennes), France, assignor to
Richier S.A., Paris, France
Filed Aug. 14, 1962, Ser. No. 216,897
Claims priority, application France, Aug. 17, 1961,
870,916, Patent 1,304,711
1 Claim. (Cl. 94—50)

This invention relates in general to road rollers and like earthmoving machines, and has specific reference to a vibration cylinder mechanism characterized by the fact that it produces unidirectional vibration the direction of which can be adjusted by an operator while the cylinder is in motion.

This unidirectional vibration cylinder with direction adjustment means, which is designed notably for equipping earthmoving machines such as road rollers and the like is rotatably mounted on a stub-axle shaped portion of a body of which another portion constituting a casing and having mounted thereon the frame structure of the machine encloses a drive member for rotatably driving the cylinder and another drive member for rotatably driving at the same speed and in opposite directions two inertia or unbalancing weights mounted coaxially in the stub-axle shaped portion of said body.

The two inertia or unbalancing weights are constructed to have the same value for the product of the rotary mass by the distance from its centre of gravity to the axis of rotation, and therefore they produce a unidirectional alternating effort the direction of which depends on the relative initial angular setting of the two weights.

Means for example hydraulic means, are provided for adjusting at will this initial angular setting of the two unbalance weights.

The features and advantages of this invention will appear more clearly as the following description of a typical form of embodiment thereof proceeds with reference to the accompanying drawings given by way of example and wherein:

FIGURES 1 and 2 show a vertical axial section and a side elevational view respectively of the vibration cylinder, the side view showing the casing-forming body portion.

Figure 4:
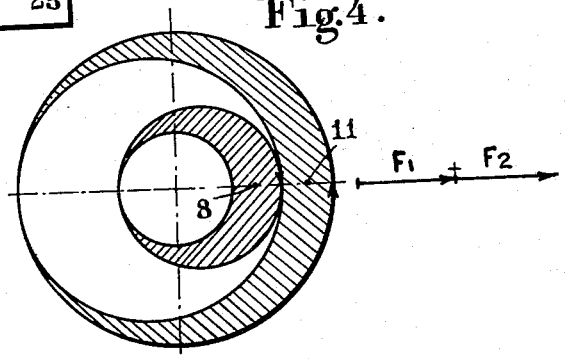

FIGURES 4 and 5 are diagrammatic sections showing the two unbalance weights, in the two phases of the rotation during which the centrifugal forces of the two weights add themselves or cancel each other arithmetically, respectively; the angular setting of the second unbalanced weight being such that the vibratory force exerted at right angles to the cylinder axis is applied in the horizontal direction.

Figure 7:
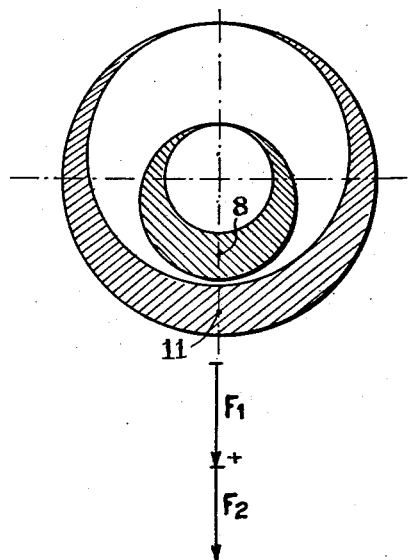

FIGURES 6 and 7 are similar diagrams with the angular setting of the second unbalanced weight such that a vibratory force exerted in the vertical direction is obtained.

Figure 1:
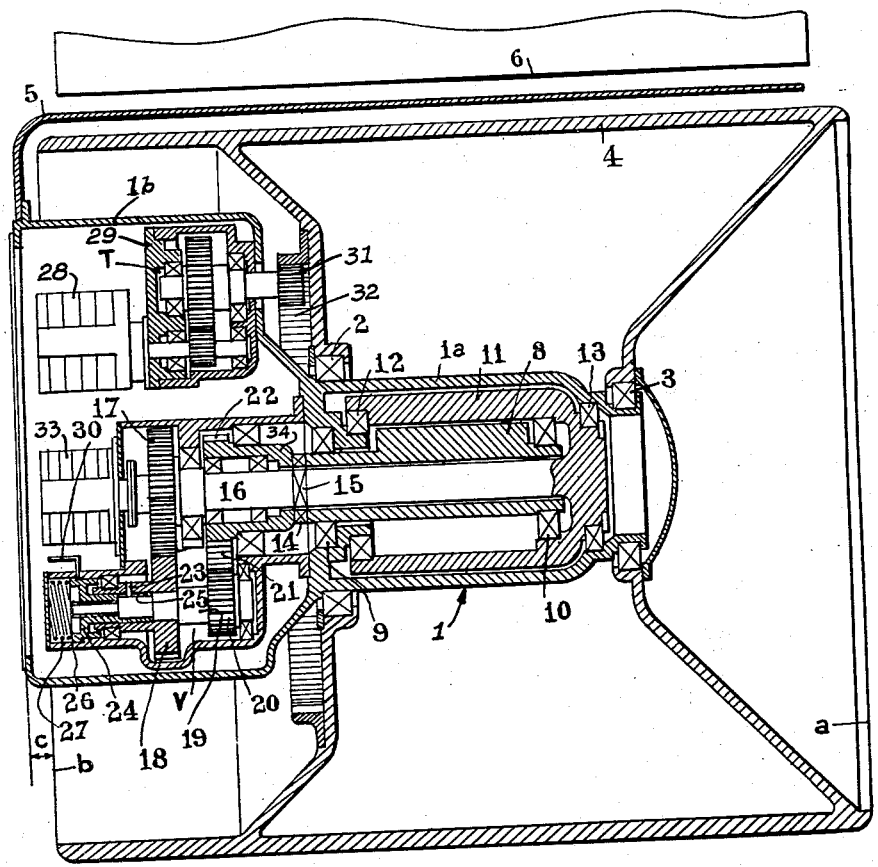
Figure 8:
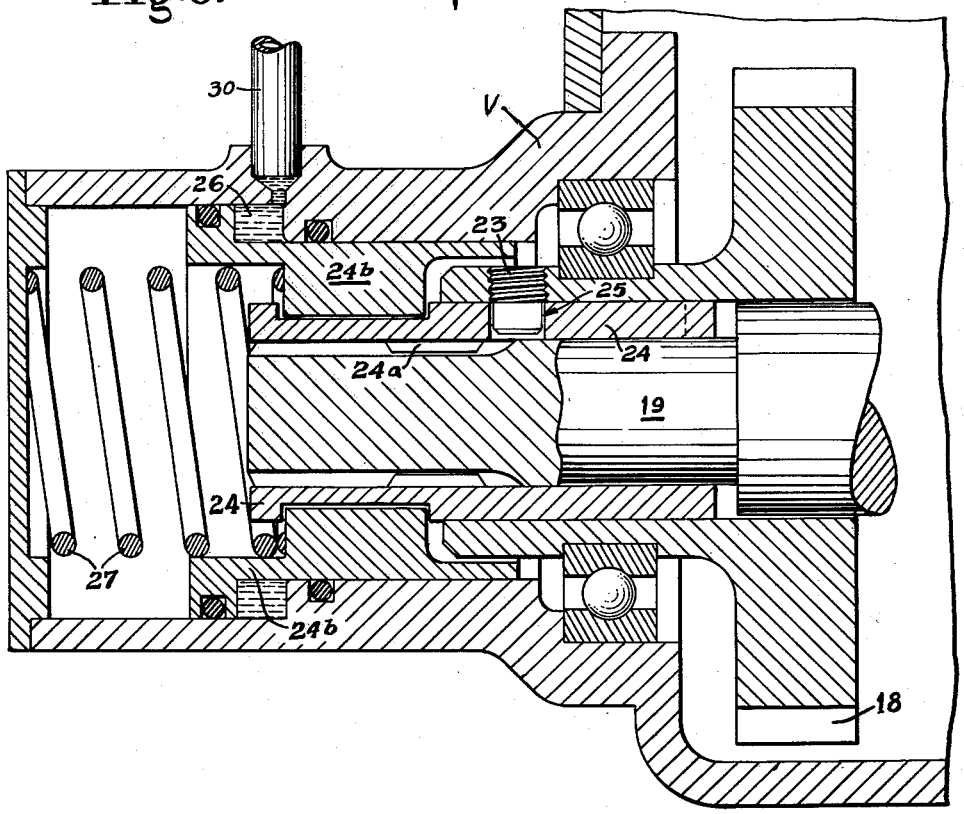

FIGURE 8 shows an enlarged portion of FIGURE 1 which illustrates details of the hydraulic means provided for adjusting the relative angular setting of the two unbalanced weights in one position of said hydraulic means which differs from that shown in FIGURE 1.

Referring more in detail to the drawings, a body 1 comprises a substantially cylindrical stub-axle like portion 1a on which the cylinder 4 is mounted through the medium of bearings 2, 3. This body flares out on the opposite side to form a casing 1b in which are housed a case V controlling the vibration and a case T controlling through a double reduction gearing the rotation of cylinder 4.

The lateral face of this casing carries a support 5 surrounding partially the cylinder 4 and supporting the frame structure 6 of the machine by means of suspension pads 7 of elastic material.

As a consequence of this specific arrangement, the cases enclosing the mechanisms controlling the two functions, that is, the cylinder vibration and the cylinder translation, are grouped on a same side so that one side of the cylinder (see reference letter $a$) is completely free and the opposite side (see reference letter $c$) has a minimum over-all dimension. The drive members may advantageously consist of electrical or hydraulic drives, or any other transmission system. The case T controlling the cylinder rotation comprises a driving member 28 adapted through the intermediary of a step-down gearing 29 rotatably to drive a pinion 31 meshing with a toothed wheel 32 solid with the cylinder 4.

The vibrator proper consists of a pair of coaxial unbalancing weights 11, 8. The second or inner weight 8 supported by bearings 9, 10 revolves inside the first weight 11 at exactly the same speed as, but in the opposite direction, to the first weight 11. This first or outer unbalance weight 11 is supported by bearings 12 and 13, and revolves inside the stub-axle like portion 1a of the body 1, as shown.

The vibration control casing V comprises another power member 33 actuating a shaft 16 drivingly connected through a rigid coupling 15 to the first unbalanced weight 11. This shaft 16 is adapted rotatably to drive this first unbalanced weight 11 and carries a pinion 17 for transmitting the drive to the other unbalanced weight 8. This pinion 17 is in meshing engagement with another pinion 18 rigidly connected to a pinion 20. This pinion 20 drives a reversing pinion 21 meshing in turn with a toothed annulus 22 formed in the outer periphery of a bell-shaped member 34 mounted coaxially on the shaft 16 and rigidly connected through coupling means 14 to the other unbalanced weight 8.

As pinions 17 and 22 on the one hand, 18 and 20 on the other hand, have the same number of teeth, the driving couplings 15 and 114, and thus the two unbalanced weights 11 and 8 will revolve in opposite directions but at exactly the same speed.

The two unbalanced weights 11 and 8 are designed preferably with the same unbalance value, that is, with the same value for the product of their mass by the distance from their center of gravity to the axis of rotation. When the radial planes of the centers of gravity of the two unbalanced weights are coincident with each other the centrifugal forces $F_1$ and $F_2$ of these two unbalanced weights add themselves arithmetically and act in the direction shown in FIGURE 4. When, as a consequence of their rotation in opposite directions at the same speed, the two unbalanced weights have each performed a half-revolution, the same centrifugal forces $F_1$ and $F_2$ are still acting but in the opposite direction. A rotation of only one-fourth of a revolution from the position shown in FIGURE 4 leads to the position of FIGURE 5 wherein the separate centrifugal forces $F_1$ and $F_2$ of the two unbalanced weights act in opposite directions and balance each other exactly due to the equality of the two values of the eccentric loads. The assembly consisting of the two unbalanced weights will thus exert an alternating vibratory force constantly directed in a same plane passing through the axis of rotation which, in the case illustrated in FIGURES 4 and 5, is a horizontal plane. The construction according to this invention comprises a device permitting, by means of simple control means adapted to be actuated by the operator of the road roller during a ramming operation, of setting at the desired inclination the plane in which the vibration is effective and, for example, of making same coincident with the vertical plane passing through the axis of rotation, as shown diagrammatically in FIGURES 6 and 7. This result is obtained by resorting to an adjustable angular setting of the transmission shaft 19 in relation to the pinion 18 mounted on this shaft and to manual means for controlling this angular setting. This special arrangement is described hereinafter.

Figure 3:
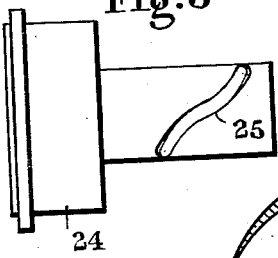
FIGURE 3 is a detail view showing on a larger scale the mechanism for adjusting the relative initial angular setting of the two unbalance weights.

Pinion 18 is adjustably coupled in rotation to shaft 19 through three radial pins 23 engaging helical grooves 25 (see FIG. 3) formed in a sleeve 24 mounted through splines 24a on shaft 19 so that it can slide thereon. This sleeve 24 is fastened to a piston-shaped end portion 24b limiting against casing V a single-acting annular hydraulic cylinder 26 and constantly urged to a limit position corresponding to the closing of the annular cylinder by a compression spring 27. Thus, the delivery of hydraulic fluid under pressure through the line 30 leading into said annular cylinder 26 permits the desired angular setting of shaft 19 in relation to the pinion 18 and therefore the angular setting of the second unbalancing weight 8. This adjustment control means may also be of mechanical character and comprise a step by step positioning device.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claim.

What I claim is:

In a machine, notably a road roller, comprising a frame and a cylinder mounted under said frame, an arrangement for rotatably driving said cylinder, vibrating said cylinder in a fixed direction extending at right angles to its axis of rotation, and permitting the adjustment of this direction during the operation of the road roller, said arrangement comprising a body having a portion of hollow stub-shaft configuration on which said cylinder is rotatably mounted, and another portion constituting a casing on which said frame is resiliently mounted, members mounted in said stub-shaft shaped body portion and consisting of a first hollow unbalanced weight rotatably mounted about the axis of rotation of said cylinder, said first unbalanced weight having an inner axial extension, a second hollow unbalanced weight mounted on said inner extension of said first unbalanced weight and rotatable coaxially in said first unbalanced weight, and members mounted in said casing-forming body portion and consisting of a first driving member rotatably driving said cylinder, a second driving member having a shaft rigidly connected to said inner extension of said first unbalanced weight, a pinion keyed on the shaft of said second driving member, a transmission shaft rotatably mounted parallel to the shaft of said second driving member, a sleeve mounted on, and rigidly coupled for rotation with, said transmission shaft, a journal-forming shoulder on said sleeve, said casing being formed with a thrust shoulder corresponding to said journal-forming shoulder of said sleeve, and with a bearing surface, a compression spring bearing against said casing bearing surface and slidably urging said sleeve on said transmission shaft to a limit contact position of said journal-forming shoulder of said sleeve with said thrust shoulder of said casing, hydraulic means delivering into the gap formed between said casing thrust-shoulder and said sleeve journal-forming shoulder the amount of compressed fluid necessary for keeping said sleeve on said intermediate shaft in the desired position against the resistance of said spring, said sleeve having at least one helical groove formed therein, a pinion rotatably mounted on said transmission shaft and rotatably solid with the shaft of said other driving member by meshing engagement with the pinion keyed on the shaft of said other driving member, said sleeve and therefore said transmission shaft being rotatably solid with said pinion rotatably mounted on said transmission shaft with an angular setting adjustable through said hydraulic means, through the intermediary of a stud extending radially through said pinion and engaging said helical groove of said sleeve, a pinion rigidly keyed on said transmission shaft, a bell-shaped member rigidly connected to said other unbalanced weight, a circular set of teeth cut in the outer periphery of said bell-shaped member and a reversing pinion meshing simultaneously with said pinion rigidly keyed on said transmission shaft and with said circular set of teeth cut in the outer periphery of said bell-shaped member.

References Cited by the Examiner

UNITED STATES PATENTS

| 1,615,052 | 1/27 | Stubbs | 94—48 |
| 2,677,995 | 5/54 | Wood | 94—48 |

FOREIGN PATENTS

| 658,718 | 10/51 | Great Britain. |
| 767,968 | 2/57 | Great Britain. |
| 1,018,538 | 10/52 | France. |

JACOB L. NACKENOFF, *Primary Examiner.*